US010754785B2

(12) United States Patent
Zhang et al.

(10) Patent No.: US 10,754,785 B2
(45) Date of Patent: Aug. 25, 2020

(54) CHECKPOINTING FOR DRAM-LESS SSD

(71) Applicant: Intel Corporation, Santa Clara, CA (US)

(72) Inventors: Mingwei Zhang, Hillsboro, OR (US); Zheng Zhang, Portland, OR (US); Ravi Sahita, Portland, OR (US)

(73) Assignee: Intel Corporation, Santa Clara, CA (US)

(*) Notice: Subject to any disclaimer, the term of this patent is extended or adjusted under 35 U.S.C. 154(b) by 202 days.

(21) Appl. No.: 16/021,469

(22) Filed: Jun. 28, 2018

(65) Prior Publication Data
US 2019/0042462 A1 Feb. 7, 2019

(51) Int. Cl.
G06F 12/00 (2006.01)
G06F 12/1009 (2016.01)
G06F 12/02 (2006.01)

(52) U.S. Cl.
CPC ...... G06F 12/1009 (2013.01); G06F 12/0246 (2013.01); *G06F 2212/1032* (2013.01); *G06F 2212/7201* (2013.01)

(58) Field of Classification Search
CPC ............. G06F 12/1009; G06F 12/0246; G06F 2212/7201; G06F 2212/1032
See application file for complete search history.

(56) References Cited

U.S. PATENT DOCUMENTS

| 5,481,694 A | 1/1996 | Chao et al. |
| 5,845,313 A * | 12/1998 | Estakhri ............... G06F 3/0613 711/103 |
| 6,978,342 B1 * | 12/2005 | Estakhri ............... G06F 3/0613 711/103 |
| 9,671,971 B2 | 6/2017 | Trika et al. |
| 2006/0143362 A1 | 6/2006 | Li et al. |
| 2006/0155946 A1 | 7/2006 | Ji |
| 2007/0168698 A1 | 7/2007 | Coulson et al. |
| 2007/0276988 A1 * | 11/2007 | Luo ..................... G06F 12/0246 711/103 |
| 2009/0240873 A1 * | 9/2009 | Yu ......................... G06F 3/0608 711/103 |
| 2011/0238888 A1 | 9/2011 | Chiu et al. |
| 2011/0276827 A1 | 11/2011 | Royer, Jr. et al. |
| 2011/0282842 A1 | 11/2011 | Popovski et al. |

(Continued)

OTHER PUBLICATIONS

Bjorling, Matias, "Open-Channel Solid State Drives", presentation, 2016, 38 pages, CNEX Labs, Linux Software Foundation Vault.

(Continued)

*Primary Examiner* — Jing-Yih Shyu
(74) *Attorney, Agent, or Firm* — Spectrum IP Law Group LLC

(57) ABSTRACT

Methods and apparatus related to checkpointing for Solid State Drives (SSDs) that include no DRAM (Dynamic Random Access Memory) are described. In one embodiment, Non-Volatile Memory (NVM) stores an original Logical address to Physical address (L2P) table entry and a shadow L2P table entry. Allocation logic circuitry causes storage of the original L2P table entry and the shadow L2P table entry sequentially in the NVM. Data read from the shadow L2P table entry is capable to indicate a state of the original L2P table entry. Other embodiments are also disclosed and claimed.

25 Claims, 8 Drawing Sheets

(56) References Cited

U.S. PATENT DOCUMENTS

| | | |
|---|---|---|
| 2011/0307449 A1 | 12/2011 | Cargille et al. |
| 2012/0173794 A1* | 7/2012 | Royer, Jr. ............ G06F 11/1451 711/103 |
| 2013/0332660 A1 | 12/2013 | Talagala et al. |
| 2014/0189275 A1 | 7/2014 | Chiu et al. |
| 2014/0325117 A1* | 10/2014 | Canepa ............... G06F 12/0246 711/103 |
| 2015/0066844 A1 | 3/2015 | Yin et al. |
| 2015/0331624 A1* | 11/2015 | Law ........................ G06F 12/10 711/103 |
| 2016/0117225 A1* | 4/2016 | Yu ....................... G06F 11/1666 714/15 |
| 2016/0132313 A1 | 5/2016 | Jaisinghani et al. |
| 2016/0283160 A1 | 9/2016 | Trika et al. |
| 2016/0378369 A1 | 12/2016 | Ash et al. |
| 2017/0139782 A1 | 5/2017 | Chen |
| 2017/0322526 A1 | 11/2017 | Heine et al. |
| 2017/0344430 A1 | 11/2017 | Greer et al. |
| 2017/0364411 A1 | 12/2017 | Fan et al. |
| 2017/0371916 A1 | 12/2017 | Shimamura et al. |
| 2018/0046803 A1 | 2/2018 | Li et al. |
| 2018/0067816 A1 | 3/2018 | Guthrie et al. |
| 2018/0173420 A1* | 6/2018 | Li ........................... G06F 3/061 |
| 2018/0293174 A1* | 10/2018 | Song ................... G06F 12/1009 |
| 2019/0102262 A1* | 4/2019 | Sukhomlinov ......... G06F 21/00 |
| 2019/0370169 A1* | 12/2019 | Amato ................ G06F 12/1018 |

OTHER PUBLICATIONS

Gonzalez, Javier, "RocksDB on Open-Channel SSDs", RocksDB Annual Meetup '15-Facebook, CNEXLABS, 17 pgs.

Swanson, Steve, "Flash Memory Overview", NVSL, 30 pgs.

Office Action received for U.S. Appl. No. 15/721,625, dated Apr. 17, 2019, 14 pages.

Huang, et al., "Flash Guard: Leveraging Intrinsic Flash Properties to Defend Against Encryption Ransomware," symposium, Oct. 30-Nov. 3, 2017, pp. 2231-2244, CCS, Dallas, TX.

Office Action received for U.S. Appl. No. 14/672,020, dated Jul. 5, 2016, 5 pages.

Office Action received for U.S. Appl. No. 14/672,020, dated Nov. 3, 2016, 6 pages.

International Search Report and Written Opinion received for International Patent Application No. PCT/US2016/019961, dated Jul. 11, 2016, 10 pages.

Intel Corporation, "Intel Solid-State Drive DC S3700 Series," Product Specification, Jan. 2015, 34 pages.

* cited by examiner

| Shadow L2P Values | | |
|---|---|---|
| (0,0,0,0) | (1,0,0,0) | Other Value |
| Never touched: all reads should go to original L2P entry | Written but deleted: all reads should go to shadow L2P and receive zeroed data | Written: all reads should go to shadow L2P and receive the data it points to | ic to computer systems of both consumers and enterprises.
CHECKPOINTING FOR DRAM-LESS SSD

FIELD

The present disclosure generally relates to the field of electronics. More particularly, some embodiments generally relate to checkpointing for Solid State Drives (SSDs) that include no DRAM (Dynamic Random Access Memory).

BACKGROUND

In recent years, ransomware has caused significant damage to computer systems of both consumers and enterprises. Different from other malware, ransomware fundamentally focuses on user data corruption including encryption instead of, for example, controlling and locking only the victim Operating System (OS). This unique feature in ransomware calls for checkpoint techniques for data protection. Generally, a checkpoint may allow data to be recovered to its previous "state" where the previous state, for example, represents a snapshot of the whole storage.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
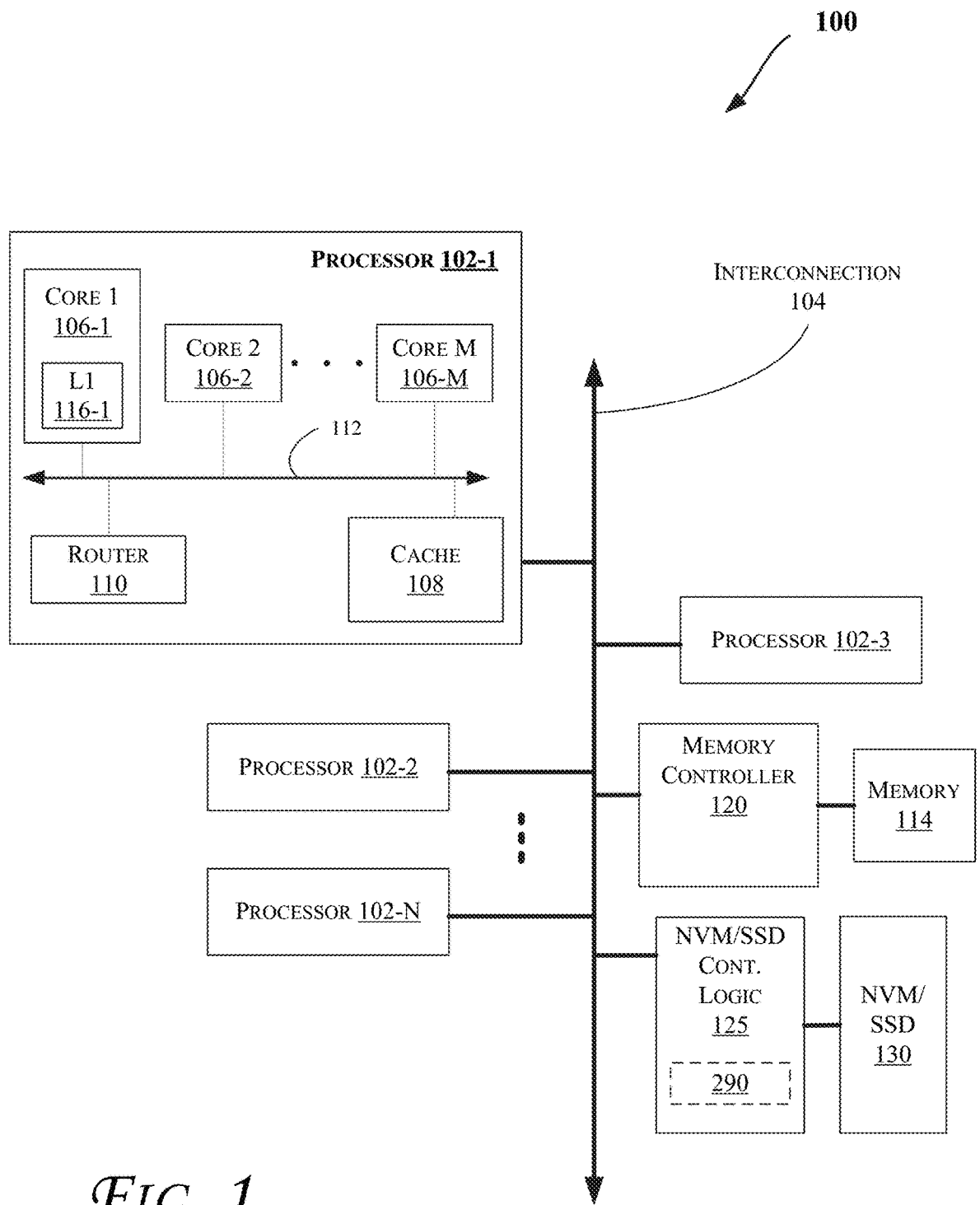
FIGS. 1, 3, 4, and 5 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, a checkpoint may allow data to be recovered to its previous "state" where the previous state represents a snapshot of the entire storage, for example. This allows for recovery from data loss, e.g., due to hardware failure, ransomware, etc. Further, some implementations perform checkpointing using DRAM (also referred to here as "DRAM-assisted-checkpointing"), leveraging the intrinsic features of an SSD such as the Logical address to Physical address translation (L2P) (or Flash Translation Layer (FTL)) table for data protection. Because of the frequent usage of L2P, the whole L2P table can be stored in the DRAM of a SSD drive for faster access instead of in its storage media. DRAM-assisted-checkpointing may leverage L2P by reserving the second 50% of the table (or shadow L2P table) for new data mapping, while exposing only the first 50% of L2P to Operating System (OS), and any software application running atop the OS. This means that DRAM-assisted-checkpointing can require 50% storage space reservation.

However, the advancement of modern computer systems demands both faster storage techniques and smaller size storage media. Because of that, traditional SSD form factors (e.g., 2.5 inch drives) no longer fit the current requirements in several cases, especially Ultrabook™ computing devices, tablets, or 2-in-1 computing devices. On the other hand, further reducing the size from an already small form factor (like M.2) would be challenging without reducing hardware capability. In such an environment, DRAM-less SSD drives can be considered as a solution because they can provide a smaller form factor than traditional SSDs (for instance, BGA (Ball Grid Array) SSDs). However, one clear disadvantage of a DRAM-less SSD over a traditional SSD can be the potential performance loss, e.g., since the absence of DRAM can require every storage I/O to perform one extra (slower) media read to look up the FTL table.

Further, in a DRAM-assisted-checkpointing design, every Logical Block Address (LBA) maps to two LBAs (original data and shadow data). Each read access can be decided by a "state" associated with the target data, wherein the state indicates whether the target data is "dirty" (e.g., overwritten or modified, or otherwise invalid). If it is "dirty", read access will be directed to its "shadow LBA" address in the reserved portion of the L2P. If the state is "clean", then read will be served by the original LBA. However, supporting the above simple logic efficiently in DRAM-less SSD models can be time-consuming because every I/O requires an extra FTL lookup (now stored in the SSD media instead of the now absent DRAM), making the overall performance unacceptable.

One potential solution would be to add a "dirty bitmap." The dirty bitmap may contain the "state" of each LBA (e.g., one bit per 8 LBA) to determine how an I/O targeting each LBA should be routed. However, even the dirty bitmap requires a sizeable amount of DRAM that DRAM-less SSD could not afford. For instance, an 800 Gigabyte SSD requires 800 Megabytes to store the FTL and 25 Megabytes for a dirty bitmap. For DRAM-less SSD, 25 Megabytes extra memory footprint would be unacceptable. Moreover, managing the dirty bitmap significantly increases the complexity of firmware (since the dirty bitmap would be the same as L2P in structure, and firmware has to perform the paging for the dirty bitmap as well as the paging for L2P).

To this end, some embodiments provide checkpointing for Solid State Drives (SSDs) that include no DRAM (Dynamic Random Access Memory), e.g., by solving the technical challenges of extending DRAM-assisted-checkpointing to support DRAM-less SSD drives. In an embodiment, Non-Volatile Memory (NVM) stores an original Logical address to Physical address (L2P) table entry and a shadow L2P table entry. Allocation logic circuitry causes storage of the original L2P table entry and the shadow L2P table entry sequentially in the NVM. Data read from the shadow L2P table entry is capable to indicate a state of the original L2P table entry.

Furthermore, one or more embodiments discussed herein may be applied to any type of memory or storage device including Non-Volatile Memory (NVM), e.g., provided in an SSD. Also, embodiments are not limited to a single type of NVM, and non-volatile memory of any type or combinations of different NVM types (e.g., including NAND and/or NOR type of memory cells or other types of media usable for non-volatile storage) may be used. The memory media (whether used in DIMM (Dual Inline Memory Module) format, SSD format, or otherwise) can be any type of memory media including, for example, one or more of: nanowire memory, Ferro-electric Transistor Random Access Memory (FeTRAM), Magnetoresistive Random Access Memory (MRAM), multi-threshold level NAND flash memory, NOR flash memory, Spin Torque Transfer Random Access Memory (STTRAM), Resistive Random Access Memory, byte addressable 3-Dimensional Cross Point Memory, single or multi-level PCM (Phase Change Memory), memory devices that use chalcogenide phase change material (e.g., chalcogenide glass) or "write in place" non-volatile memory. Also, any type of Random Access Memory (RAM) such as Dynamic RAM (DRAM), backed by a power reserve (such as a battery or capacitance) to retain the data, may provide an NV memory solution. Volatile memory can include Synchronous DRAM (SDRAM). Hence, even volatile memory capable of retaining data during power failure or power disruption(s) may be used for memory in various embodiments.

The techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, smart bracelet, etc.), including those discussed with reference to FIGS. 1-5. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a processor cache 108 (which may be a shared cache or a private cache in various embodiments), and/or a router 110. The processor cores 106 may be implemented on a single integrated circuit (IC) chip. Moreover, the chip may include one or more shared and/or private caches (such as processor cache 108), buses or interconnections (such as a bus or interconnection 112), logic 120, memory controllers (such as those discussed with reference to FIGS. 3-5), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The processor cache 108 may store data (e.g., including instructions) that are utilized by one or more components of the processor 102-1, such as the cores 106. For example, the processor cache 108 may locally cache data stored in a memory 114 for faster access by the components of the processor 102. As shown in FIG. 1, the memory 114 may be in communication with the processors 102 via the interconnection 104. In an embodiment, the processor cache 108 (that may be shared) may have various levels, for example, the processor cache 108 may be a mid-level cache and/or a last-level cache (LLC). Also, each of the cores 106 may include a level 1 (L1) processor cache (116-1) (generally referred to herein as "L1 processor cache 116"). Various components of the processor 102-1 may communicate with the processor cache 108 directly, through a bus (e.g., the bus 112), and/or a memory controller or hub.

As shown in FIG. 1, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

System 100 also includes NV memory 130 (or Non-Volatile Memory (NVM), e.g., compliant with NVMe (NVM express)) coupled to the interconnect 104 via NV controller logic 125. Hence, logic 125 may control access by various components of system 100 to the NVM 130. Furthermore, even though logic 125 is shown to be directly coupled to the interconnection 104 in FIG. 1, logic 125 may communicate via a storage bus/interconnect (such as the SATA (Serial Advanced Technology Attachment) interface, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 3, 4, and/or 5), etc.). Additionally, logic 125 may be incorporated into memory controller logic (such as those discussed with reference to FIGS. 3-5) or provided on a same Integrated Circuit (IC) device in various embodiments (e.g., on the same IC device as the NVM 130 or in the same enclosure as the NVM 130). System 100 may also include other types of non-volatile memory such as those discussed with reference to FIGS. 3-5, including for example a hard disk drive, etc.

Figure 2A:
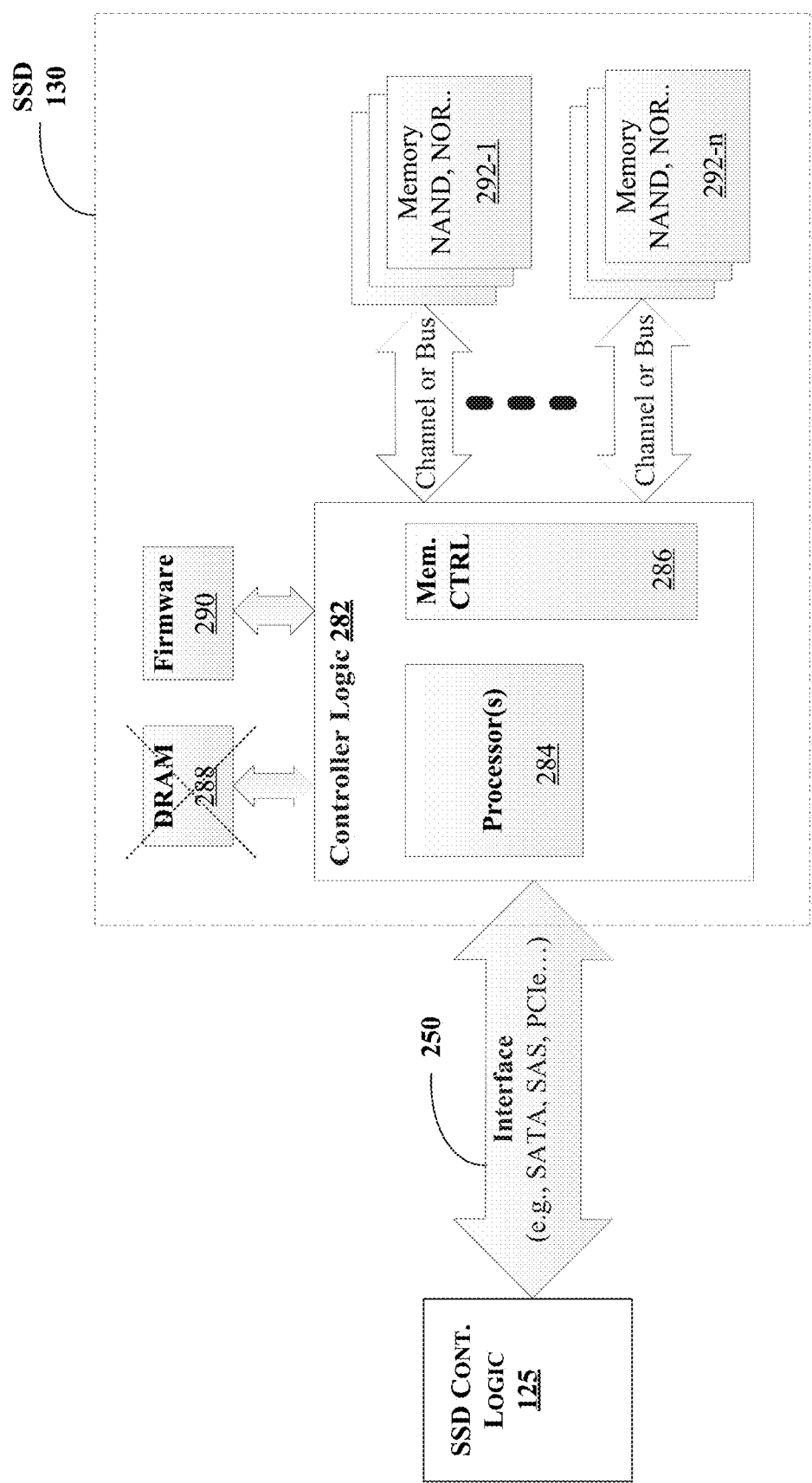
FIG. 2A illustrates a block diagram of various components of an SSD, according to an embodiment.

FIG. 2A illustrates a block diagram of various components of an SSD, according to an embodiment. While SSD controller logic 125 may facilitate communication between the SSD 130 and other system components via an interface 250 (e.g., SATA (Serial Advanced Technology Attachment), SAS (Serial-Attached SCSI (Small Computer System Interface)), PCIe, Omni-Path™ interface, InfiniBand® interface, etc.), a controller logic 282 facilitates communication between logic 125 and components inside the SSD 130 (or communication between components inside the SSD 130). Hence, in some embodiments, logic 125 is an optional external controller or a device driver that operates the SSD 130 as shown in FIG. 2A, controller logic 282 includes one or more processor cores or processors 284 and memory controller logic 286 which is coupled to firmware storage 290 and one or more memory modules or dies 292-1 to 292-*n* (which may include NAND flash, NOR flash, three dimensional cross point memory or other types of non-volatile memory such as those discussed herein). The controller logic 282 is no longer coupled to DRAM 288 since it is eliminated in a DRAM-less checkpointing in an embodiment (illustrated by crossing out of the DRAM 288 in FIG. 2A). Memory modules 292-1 to 292-*n* are coupled to the memory controller logic 286 via one or more memory channels or busses. One or more of the operations discussed with reference to FIGS. 1-5 may be performed by one or more of the components of FIG. 2A, e.g., processors 284 and/or controller 282 may compress/decompress (or otherwise cause compression/decompression) of data written to or read from memory modules 292-1 to 292-*n*. Also, one or more of the operations of FIGS. 1-5 may be programmed into the firmware 290. Furthermore, in some embodiments, a hybrid drive may be used instead of the SSD 130 (where one or more of memory modules/media 292-1 to 292-*n* having NVM media are combined into the same enclosure with other storage technology such as a hard disk drive (or electromechanical storage drive), magneto-optical drive, optical drive, etc.).

Figures 2B, 2C:
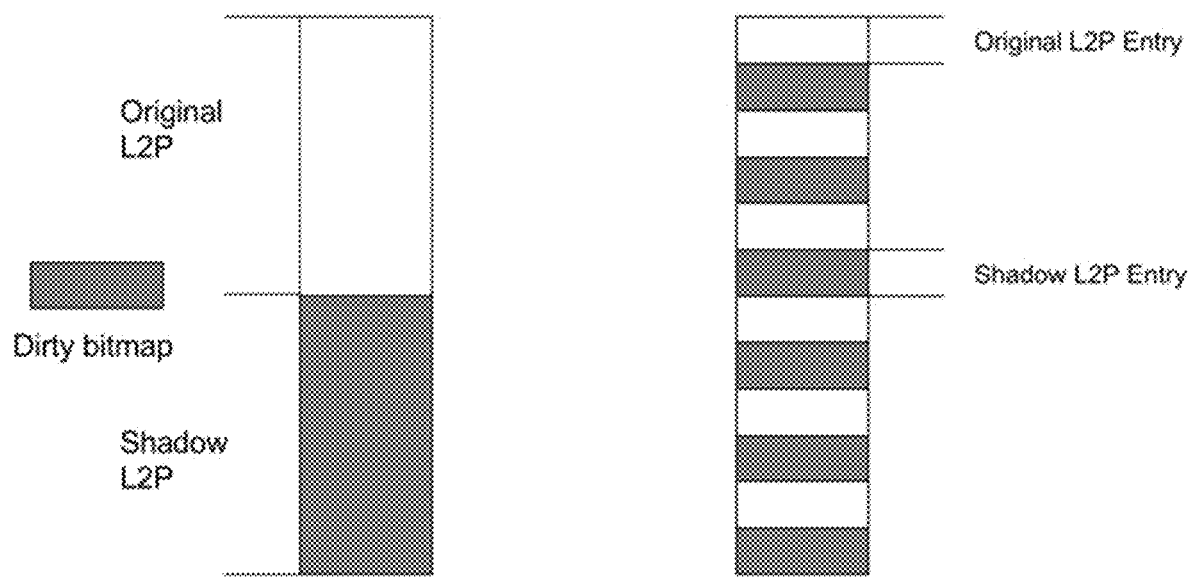
FIG. 2B demonstrates some of the differences between a DRAM-assisted-checkpointing design and a DRAM-less checkpointing, according to an embodiment.
FIG. 2C shows a table with sample controlled shadow L2P values to address potential trim operation ambiguity for DRAM-less SSD checkpointing, according to an embodiment.

As mentioned above, one or more embodiments address the limitations of DRAM-assisted-checkpointing and challenges imposed by applying DRAM-assisted-checkpointing technique to DRAM-less SSD. For example, reservation of 50% of the NVM media space is avoided, e.g., by doubling the size of L2P table. In addition, the design of DRAM-assisted-checkpointing is simplified to avoid using a dirty bitmap that leads to an increase of management complexity. To identify correct L2P entry efficiently, a shadow L2P entry is allocated just before (or just after) each original L2P entry (e.g., where original L2P entries are separated by shadow L2P entries as shown in FIG. 2B). By checking the value of shadow L2P, both the state of an L2P entry and its corresponding value can be efficiently fetched. On the other hand, since L2P table reading is "block" based in some implementations, i.e., each read directed at the NVM media would read up to 16 Kilobytes (the size of one NVM page) anyway, and as a result both the locality of physical address of adjacent LBAs and their shadow LBAs are maintained properly.

More specifically, in comparison with DRAM-assisted-checkpointing Design, some embodiments introduce at least two additional benefits that help with implementation of a DRAM-less SSD:

(1) No Reserving of 50% Media Storage: this means that for any existing SSD drive, adding DRAM-assisted-checkpointing does not requires shrinking the size of the available storage media by 50%. In an embodiment, this is achieved by doubling the size of L2P table and reserving the second part of the enlarged L2P.

(2) Simplified Design: in DRAM-assisted-checkpointing and potentially other checkpointing implementations, extra states are added to each L2P entry that is check-pointed. For instance, in DRAM-assisted-checkpointing, a dirty bit is added to indicate whether an L2P entry has been written before. Also, a version bit may be added to indicate the versioning of an L2P entry. Further, a ledger may be used to record the most recently written LBAs and their physical locations, which could add a significant overhead for queries (e.g., given that a ledger is a hash table or similar data structure that may have collisions) and extra challenges for defragment/wear leveling. By contrast, in an embodiment, none of this additional information/bits are necessary, e.g., by storing a shadow L2P entry immediately after the original L2P entry (e.g., in the next physical memory cell after the last memory cell that stores the last bit of data for the original L2P entry). In an embodiment, the original L2P entry and the shadow L2P entry are stored in physically contiguous memory cells. By doing so, any bitmap or further data structure could be avoided, since by reading the value of shadow L2P entry, the state of the data could be inferred. In addition, fetching the shadow L2P entry and original L2P entry does not require two separate media-level queries (or read operations) as mentioned before.

Hence, some embodiments provide a DRAM-less SSD implementation for NVM storage with reduced space reservation, while reducing extra complexity (e.g., in code, firmware, etc.).

FIG. 2B demonstrates some of the differences between a DRAM-assisted-checkpointing design (left) and a DRAM-less checkpointing (right), according to an embodiment. As shown, the DRAM-assisted-checkpointing design (left) includes an original L2P table, a shadow L2P, and a dirty bitmap. The DRAM-less checkpointing (right) interleaves each L2P entry with its corresponding shadow copy, and there is no need for a dirty bitmap as discussed above.

As shown in FIG. 2B. all shadow L2P entries are located just after their base L2P entries. By doing so, SSD firmware could quickly lookup the "status" of a L2P entry without introducing extra I/O or extra data structure(s) that would have to be maintained. In particular, having shadow L2P entry located just after original one has at least two benefits: (i) making the value of shadow L2P immediately available; and (ii) making the state of each L2P entry available. This is straightforward since as long as the shadow L2P entry value is non-empty (or not the initialization value for a given implementation, like all zeros), it indicates that the original L2P entry has been written previously and the read operation that reads both original and shadow entries at the same time (or any following read operation) should be serviced by the shadow entry. In other words, all read and write operations could remain the same when compared to DRAM-assisted-checkpointing, except for the L2P structure consuming double the space (e.g., 4 bytes per entry vs. 8 bytes per entry).

While read/write operations remain the same across the DRAM-assisted and DRAM-less checkpointing designs, the trim operation may introduce ambiguity that can be addressed with special handling. Moreover, SSDs generally require the OS (or a software application) to send a "delete" signal/command (also called a "trim") to the SSD firmware so that firmware could handle the L2P table properly by maintaining only the "active" parts of it. For instance, in some SSD firmware, any trim to a LBA may update the corresponding entry value to "0", indicating a deleted entry. This helps reduce workload of the internal services such as wear leveling and defragment because a deleted data block does not need to be maintained.

To correctly represent the state of a L2P entry, an embodiment overcomes any potential ambiguity of the shadow L2P entry value when its value shows that it is "deleted". In particular, the "deleted" state of a shadow L2P entry could mean two things: (a) the original L2P has never been written to so all the reads can go to (or be serviced by) the original L2P entry; or (b) the original L2P has previously been written to but later deleted, so all reads should still be serviced by the shadow L2P entry. As previously mentioned, the "deleted" state is considered to be indicated by a value stored in the entry that corresponds to an initialized/initialization state (e.g., all 0's or all 1's depending on the implementation) of memory.

FIG. 2C shows a table with sample controlled shadow L2P values to address potential trim operation ambiguity for DRAM-less SSD checkpointing, according to an embodiment. More particularly, to solve the potential ambiguity problem mentioned above, based on further analysis of SSD firmware code, it can be determined that the value "0" as the value of an L2P entry represents the first block (4K/block) of the first NVM media page (16 k/page), and if there are multiple die and multiple bands, of the first NVM die (size by configuration) of the first band (size by configuration). For clarification and simplicity, assume use of (0,0,0,0) for 0. Clearly, this location is reserved and never written to by firmware on serving normal Read/Write (RW) requests, e.g., given the fact that a NVM media page is the smallest granularity of a write behavior. Further, the value (1,0,0,0) (which represents the second block of the first NVM media page of the first die of the first band) is another location that is never used by firmware for normal RW requests. This is because all NVM media pages in the first band (called EB0) are used to store system related data and would not be written for normal I/O purposes. Thus, value "1" can be used to present the "deleted" state in shadow L2P entry.

Moreover, SSD firmware 290 is one of the most efficient locations on a storage platform to manage the states of storage since the SSD firmware can efficiently change the state operations performed at the SSD media level. To this end, in an embodiment, the code for SSD firmware 290 is modified to check both (0,0,0,0) and (1,0,0,0) as the value of "empty" as discussed with reference to FIG. 2C.

Figure 2D:
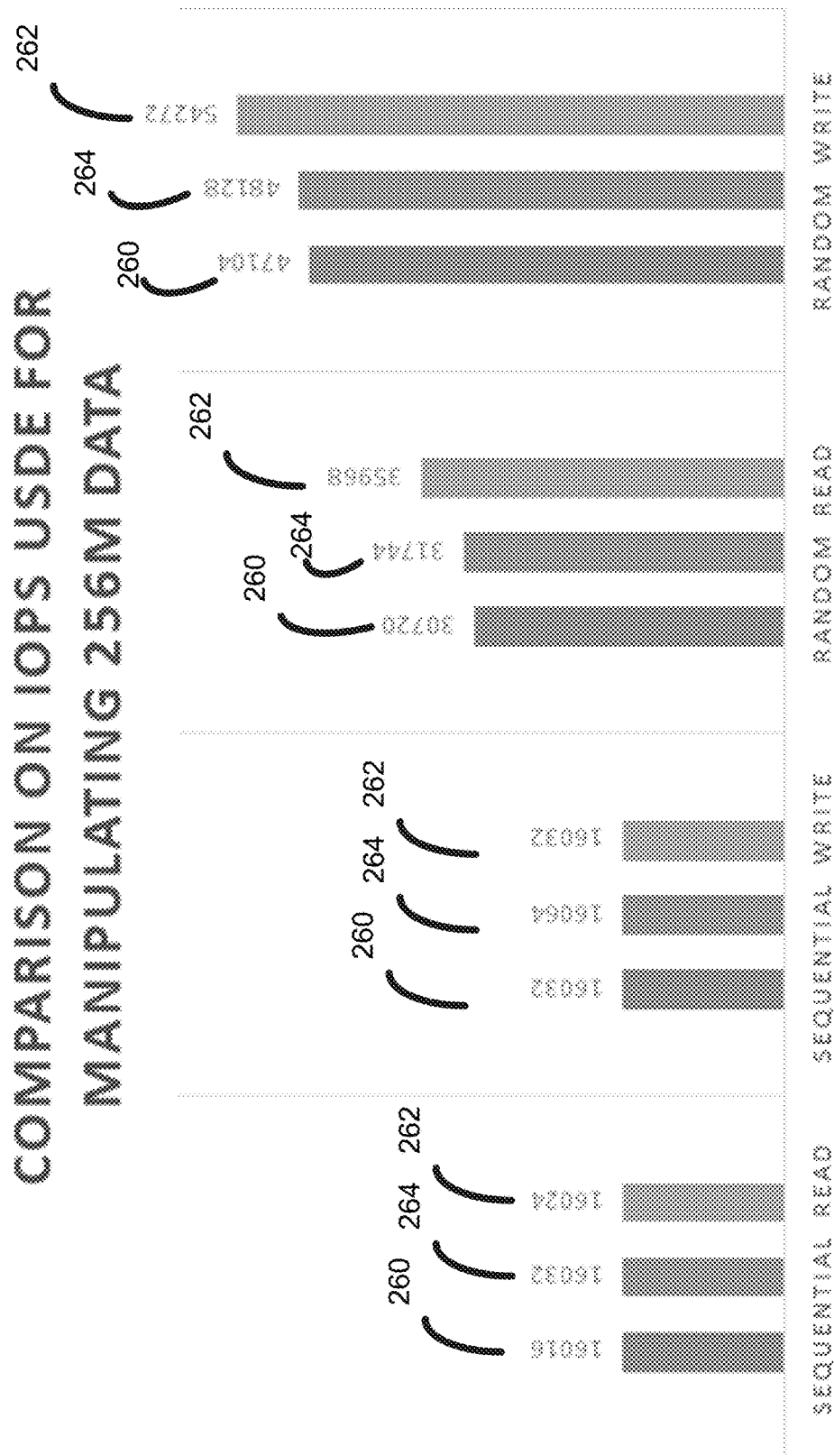
FIGS. 2D and 2E show sample graphs indicative of comparative performance of DRAM-less checkpointing, according to some embodiments.
Figure 2E:
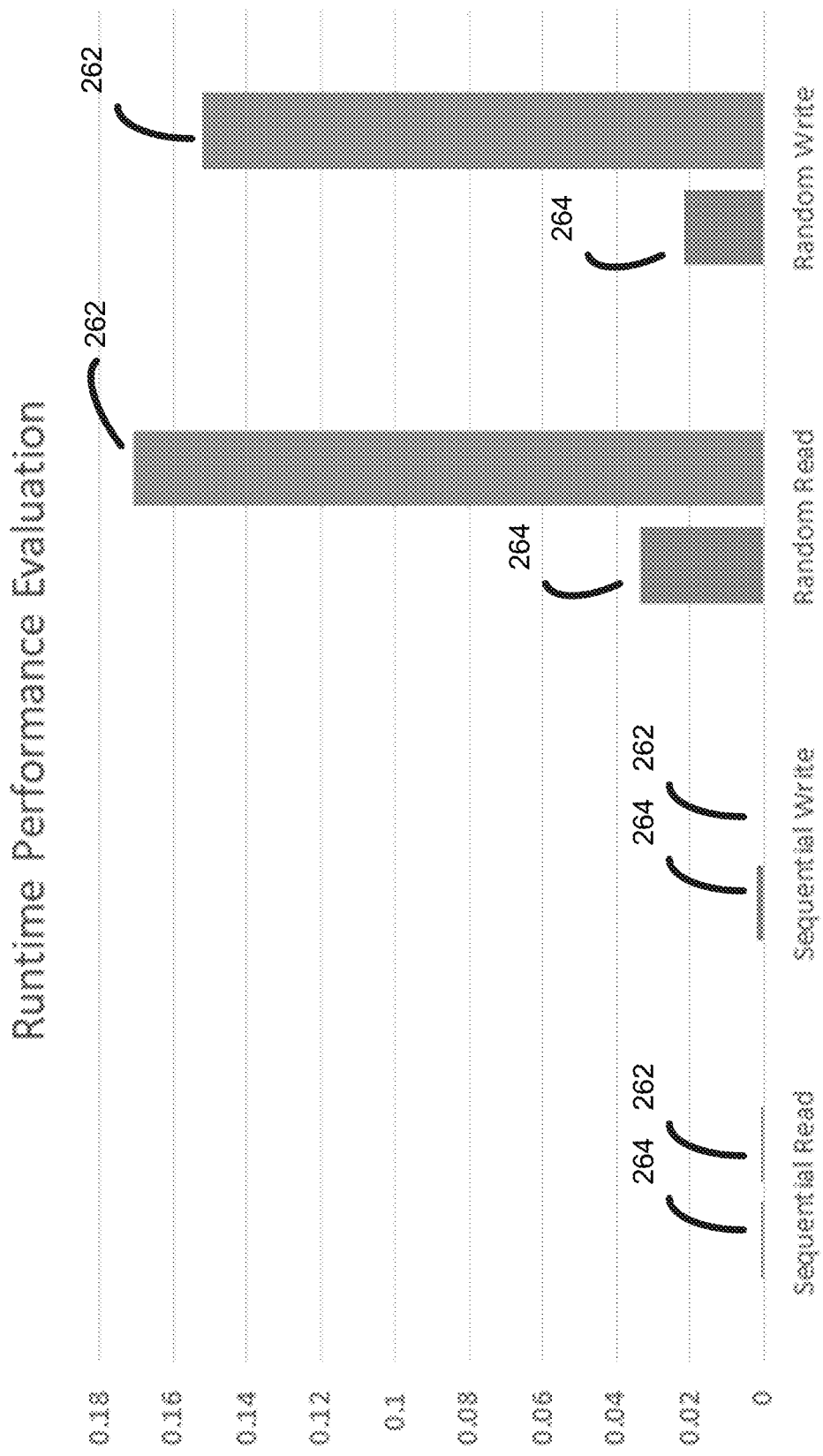

FIGS. 2D and 2E show sample graphs indicative of comparative performance of DRAM-less checkpointing, according to some embodiments. Values for a normal SSD (i.e., without checkpointing) is shown as 260, values for an SSD using the DRAM-assisted-checkpointing is shown as 262, and values for an SSD with the DRAM-less checkpointing are shown as 264. In order to approach performance near real-world values, two reasonable assumptions can be made as follows: (1) assume that SSD controller has 32 Megabytes of SRAM served as cache to store part of the L2P; (2) fifty percent of the data is dirty (i.e., for each 4 Kilobytes, there is 50% chance that it has already been written (it may have two copies)).

Referring to FIG. 2D, the performance comparison of how many Input/Output Operations Per Second (IOPS) are used for manipulation of a 256 Megabytes data chunk. This figure illustrates the significant benefit of some embodiments over DRAM-assisted-checkpointing designs for random I/O, since the DRAM-less checkpointing uses much less TOPS (i.e., lower is better in FIGS. 2D and 2E). Moreover, in FIG. 2D, no optimization is accounted for that may combine different IO operations but rather assume that they are independently processed. In general, it is also assumed the IO operations mostly comes from two sources: (1) L2P table manipulation (read/write), and (2) NVM media data manipulation (read/write). In addition, the overhead of background services such as wear leveling and defragmentation service are not taken into account, since neither approach need modification to implement the embodiments discussed herein.

In turn, sample performance overhead is shown in FIG. 2E. More particularly, FIG. 2E shows sample performance comparison of DRAM-assisted-checkpointing and DRAM-less checkpointing designs. This figure shows that some embodiments provide much improved random IO operations. The y Axis represent the runtime overhead based on the number of NVM media operations. Also, while the size of 262 for sequential write is non-zero, it is very small (fast) when compared with random I/O.

An embodiment utilizes a Host Memory Buffer (HMB) based DRAM-less SSD. As discussed herein, HMB generally refers to an optimization technique in DRAM-less SSD that allows the SSD firmware 290 to map its L2P table (FTL) into the host DRAM (e.g., memory 114 of FIG. 1). Using HMB will offset some of the benefits discussed herein with reference to one or more embodiments, since the HMB may reduce the performance penalty of the extra NVM media read operations. However, since the size of HMB can be purely decided by OS instead of firmware, the benefit it provides is optional (e.g., and by configuration instead of by design). In an embodiment, enlarging the size of HMB can also render design faster.

Furthermore, as mentioned above, DRAM-assisted-checkpointing may allow checkpoints in SSDs. It may reserve 50% of the address space of FTL to store checkpoint data. Since the size of FTL is almost the size of the SSD DRAM. Reserving 50% of the FTL address space indicates the reservation of 50% of storage for checkpoint data. Also, a ledger based checkpoint scheme may be used that records the most recent written LBAs and their physical locations. This approach may support an unlimited number of checkpoints with the clear downside that every write generates one unique version, which is unnecessary and would be a waste of space. Another approach may maintain a linked list of all stale blocks that has been previously read for each LBA, so that none of the stale data would be erased by a garbage collector. However, this approach suffers from the same problem with regards to wasted space and inefficiency. For example, if ransomware repeatedly reads the location of a file before writing it, the latter approach would ensure that the "old" data is retained (instead of being removed by the garbage collector). If ransomware repeats such procedures (reads a location and writes to the same location), it would explode the number of checkpoints that could be maintained. Accordingly, none of these approaches are suitable for production systems.

Additionally, while DRAM-assisted-checkpointing may provide data checkpointing support, the resource consumption of DRAM-assisted-checkpointing can be very large: (1) 50% of L2P is used to store the mapping of new data; and (2) 50% of media storage is used to store the actual new data. And, the ledger approach could add a significant overhead for queries (e.g., given that a ledger is a hash table or similar data structure that may have collisions) and impose extra challenges for sector defragment/wear leveling. In addition, supporting an unlimited number of checkpoints would not only incur very large management issues but also issues with potential security attacks (e.g., ransomware frequently writing to a particular position of a file millions of times, exploding the number of checkpoints to maintain).

Figure 3:
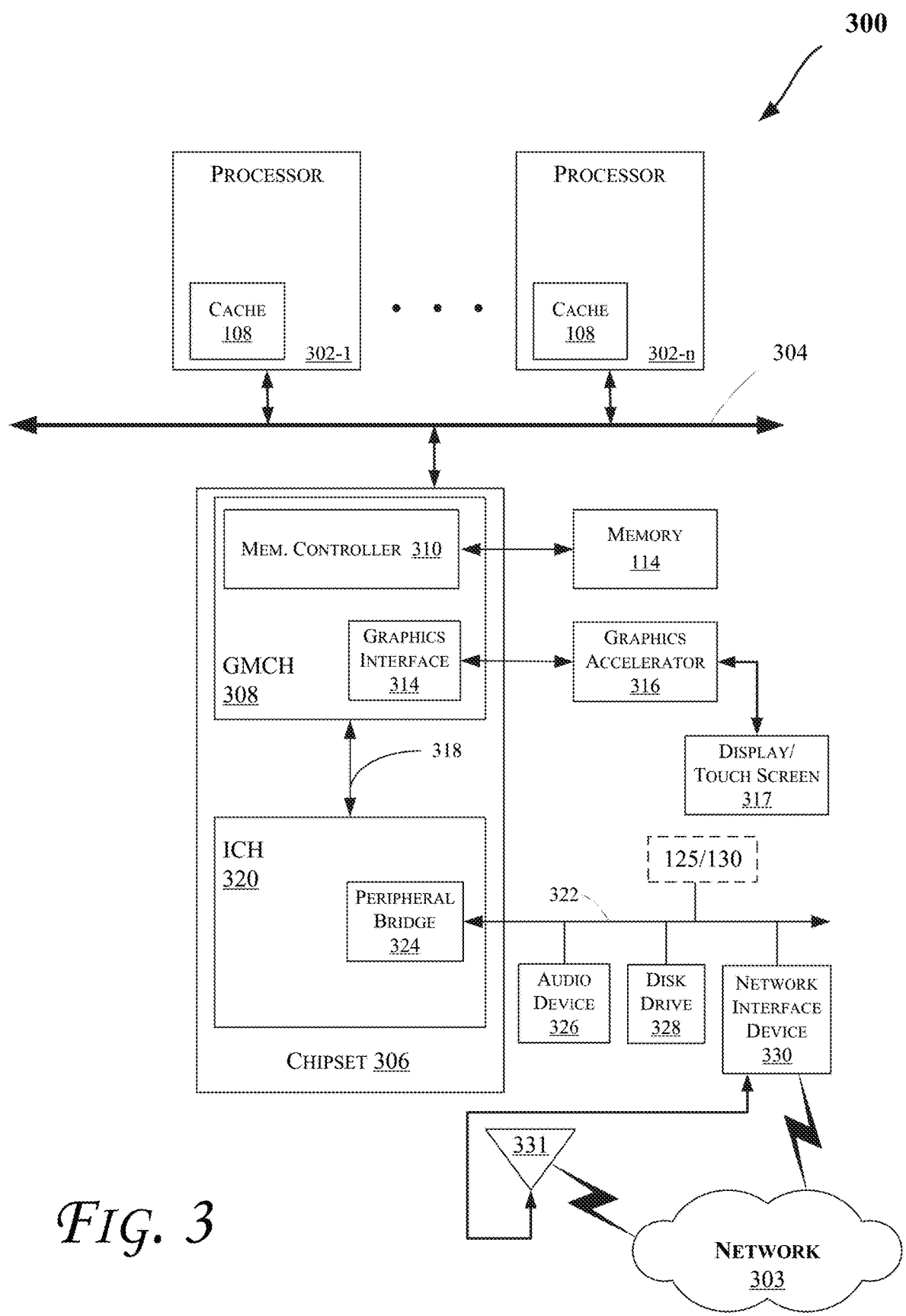

FIG. 3 illustrates a block diagram of a computing system 300 in accordance with an embodiment. The computing system 300 may include one or more central processing unit(s) (CPUs) 302 or processors that communicate via an interconnection network (or bus) 304. The processors 302 may include a general purpose processor, a network processor (that processes data communicated over a computer network 303), an application processor (such as those used in cell phones, smart phones, etc.), or other types of a processor (including a reduced instruction set computer (RISC) processor or a complex instruction set computer (CISC)).

Various types of computer networks 303 may be utilized including wired (e.g., Ethernet, Gigabit, Fiber, etc.) or wireless networks (such as cellular, including 3G (Third-Generation Cell-Phone Technology or 3rd Generation Wireless Format (UWCC)), 4G (Fourth-Generation Cell-Phone Technology), 4G Advanced, Low Power Embedded (LPE), Long Term Evolution (LTE), LTE advanced, etc.). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

In an embodiment, one or more of the processors 302 may be the same or similar to the processors 102 of FIG. 1. For example, one or more of the processors 302 may include one or more of the cores 106 and/or processor cache 108. Also, the operations discussed with reference to FIGS. 1-2E may be performed by one or more components of the system 300.

A chipset 306 may also communicate with the interconnection network 304. The chipset 306 may include a graphics and memory control hub (GMCH) 308. The GMCH 308 may include a memory controller 310 (which may be the same or similar to the memory controller 120 of FIG. 1 in an embodiment) that communicates with the memory 114. The memory 114 may store data, including sequences of instructions that are executed by the CPU 302, or any other device included in the computing system 300. Also, system 300 includes logic 125 and/or NVM 130 in various locations such as shown or not shown. In one embodiment, the memory 114 may include one or more volatile memory devices such as random access memory (RAM), dynamic RAM (DRAM), synchronous DRAM (SDRAM), static RAM (SRAM), or other types of memory devices. Nonvolatile memory may also be utilized such as a hard disk drive, flash, etc., including any NVM discussed herein. Additional devices may communicate via the interconnection network 304, such as multiple CPUs and/or multiple system memories.

The GMCH 308 may also include a graphics interface 314 that communicates with a graphics accelerator 316. In one embodiment, the graphics interface 314 may communicate with the graphics accelerator 316 via an accelerated graphics port (AGP) or Peripheral Component Interconnect (PCI) (or PCI express (PCIe) interface). In an embodiment, a display 317 (such as a flat panel display, touch screen, etc.) may communicate with the graphics interface 314 through, for example, a signal converter that translates a digital representation of an image stored in a memory device such as video memory or system memory into display signals that are interpreted and displayed by the display. The display signals produced by the display device may pass through various control devices before being interpreted by and subsequently displayed on the display 317.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330 (which is in communication with the computer network 303, e.g., via a wired or wireless interface). As shown, the network interface device 330 may be coupled to an antenna 331 to wirelessly (e.g., via an Institute of Electrical and Electronics Engineers (IEEE) 802.11 interface (including IEEE 802.11a/b/g/n/ac, etc.), cellular interface, 3G, 4G, LPE, etc.) communicate with the network 303. Other devices may communicate via the bus 322. Also, various components (such as the network interface device 330) may communicate with the GMCH 308 in some embodiments. In addition, the processor 302 and the GMCH 308 may be combined to form a single chip. Furthermore, the graphics accelerator 316 may be included within the GMCH 308 in other embodiments.

Furthermore, the computing system 300 may include volatile and/or nonvolatile memory. For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
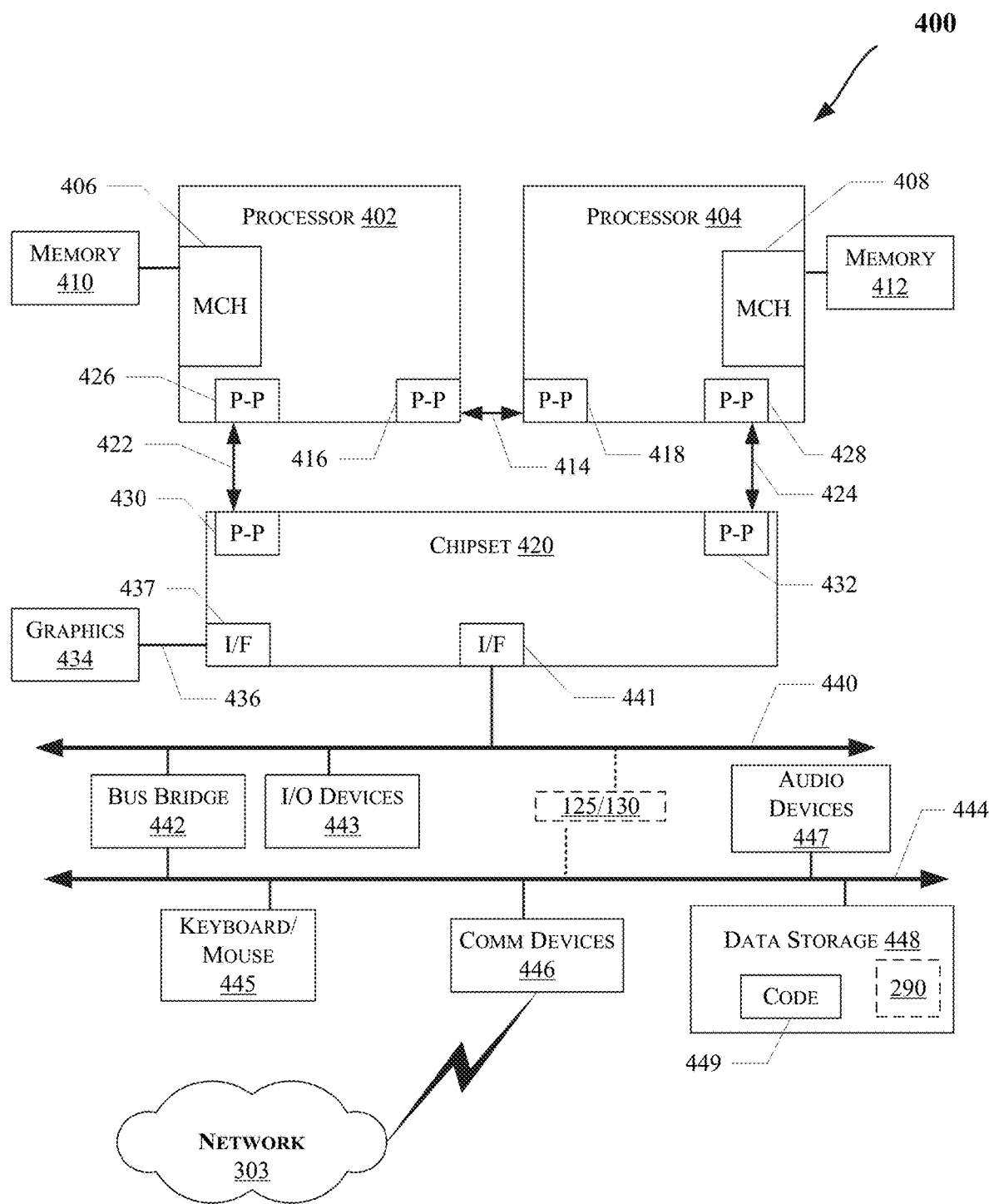

FIG. 4 illustrates a computing system 400 that is arranged in a point-to-point (PtP) configuration, according to an embodiment. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 114 of FIGS. 1 and/or 3. Also, MCH 406 and 408 may include the memory controller 120 in some embodiments. Furthermore, system 400 includes logic 125 and/or NVM 130 in various locations such as shown or not shown. The logic 125 and/or NVM 130 may be coupled to system 400 via bus 440 or 444, via other point-to-point connections to the processor(s) 402 or 404 or chipset 420, etc. in various embodiments.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437. As discussed with reference to FIG. 3, the graphics interface 436 may be coupled to a display device (e.g., display 317) in some embodiments.

In one embodiment, one or more of the cores 106 and/or processor cache 108 of FIG. 1 may be located within the processors 402 and 404 (not shown). Other embodiments, however, may exist in other circuits, logic units, or devices within the system 400 of FIG. 4. Furthermore, other embodiments may be distributed throughout several circuits, logic units, or devices illustrated in FIG. 4.

The chipset 420 may communicate with a bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303, as discussed with reference to network interface device 330 for example, including via antenna 331), audio I/O device, and/or a data storage device 448. The data storage device 448 may store code 449 that may be executed by the processors 402 and/or 404.

Figure 5:
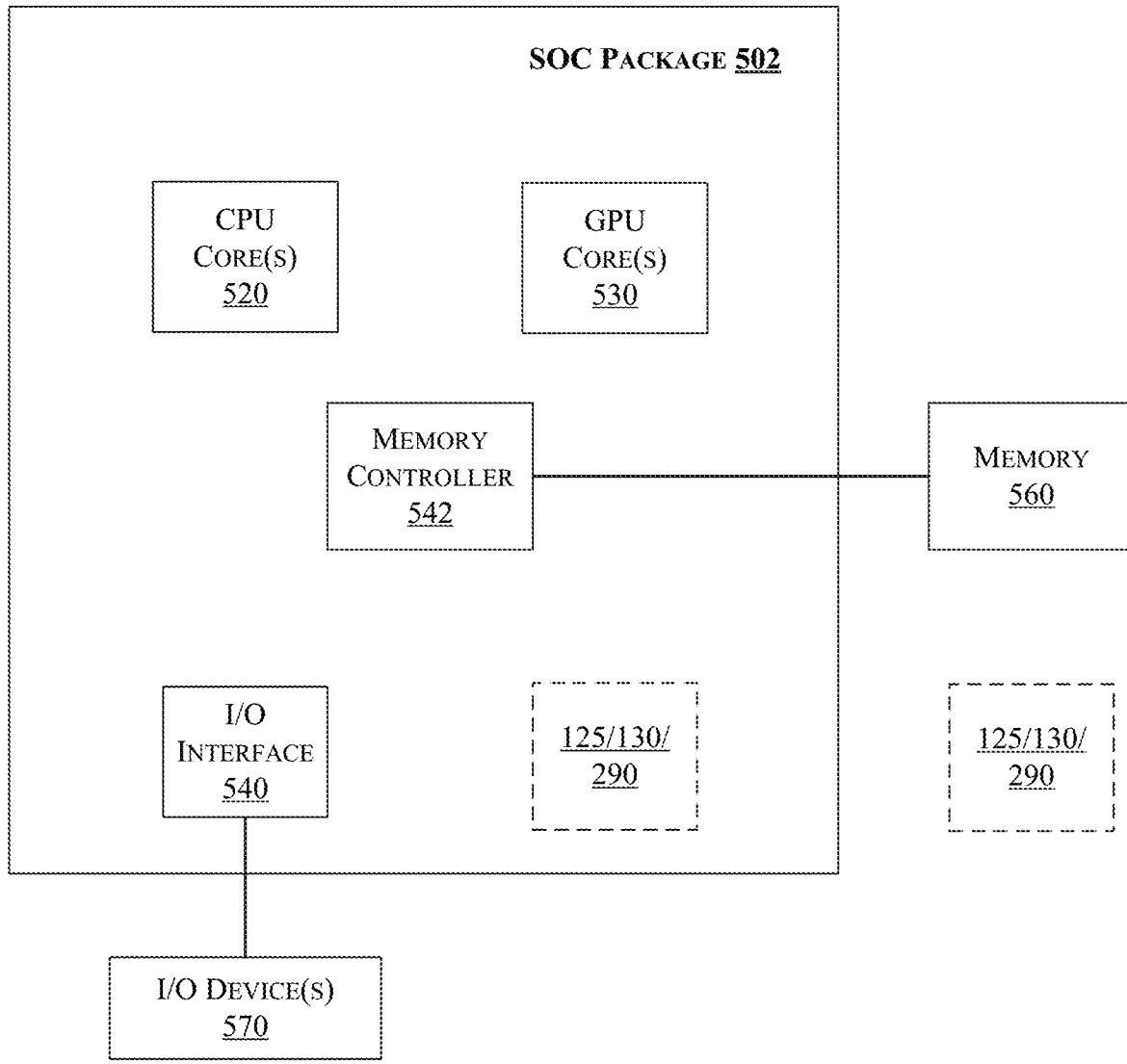

In some embodiments, one or more of the components discussed herein can be embodied as a System On Chip (SOC) device. FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged onto a single semiconductor device.

As illustrated in FIG. 5, SOC package 502 is coupled to a memory 560 (which may be similar to or the same as memory discussed herein with reference to the other figures) via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like. Furthermore, SOC package 502 may include/integrate items 125, 130, and/or 290 in an embodiment. Alternatively, items 125, 130, and/or 290 may be provided outside of the SOC package 502 (i.e., as a discrete logic).

Embodiments described herein can be powered by a battery, wireless charging, a renewal energy source (e.g., solar power or motion-based charging), or when connected to a charging port or wall outlet.

The following examples pertain to further embodiments. Example 1 includes an apparatus comprising: Non-Volatile Memory (NVM) to store an original Logical address to Physical address (L2P) table entry and a shadow L2P table entry; and allocation logic circuitry to cause storage of the original L2P table entry and the shadow L2P table entry sequentially in the NVM, wherein data read from the shadow L2P table entry is to indicate a state of the original L2P table entry. Example 2 includes the apparatus of example 1, wherein a non-empty status of the data read from the shadow L2P table entry is to indicate that the original L2P table entry has been written and that the data read from the shadow L2P table entry is to be used to service a read request directed at the original L2P table entry. Example 3 includes the apparatus of example 1, comprising logic to determine a non-empty status of the data read from the shadow L2P table entry based on a comparison of the data read from the shadow L2P table entry with an initialization value. Example 4 includes the apparatus of example 1, wherein a non-empty status of the data read from the shadow L2P table entry is to indicate that the original L2P table entry has been written and that the data read from the shadow L2P table entry is to be used to service any subsequent read request directed at the original L2P table entry. Example 5 includes the apparatus of example 1, comprising logic to update system related data of the shadow L2P table entry to indicate whether the original L2P table entry has been previously written, not written, or written and deleted. Example 6 includes the apparatus of example 5, wherein the system related data comprises a first block of the first media page of the NVM. Example 7 includes the apparatus of example 5, wherein the system related data comprises a first block of the first media page of the first die of the first band of the NVM. Example 8 includes the apparatus of example 1, wherein a single block read operation directed at the NVM is to read both the original L2P table entry and the shadow L2P table entry. Example 9 includes the apparatus of example 1, wherein the NVM is to communicate with one or more components of a computing device through one or more of: an SATA (Serial Advanced Technology Attachment) interface, a Peripheral Component Interconnect (PCI), or a PCI express (PCIe) interface. Example 10 includes the apparatus of example 1, wherein a Solid State Drive (SSD) comprises the allocation logic circuitry, the NVM, and no Dynamic Random Access Memory (DRAM). Example 11 includes the apparatus of example 10, wherein the SSD comprises a storage device to store firmware, wherein the firmware is to cause the allocation logic circuitry to store the original L2P table entry and the shadow L2P table entry sequentially in the NVM. Example 12 includes the apparatus of example 1, wherein the original L2P table entry and the shadow L2P table entry are to be stored in physically contiguous memory cells. Example 13 includes the apparatus of example 1, wherein a hybrid drive comprises the NVM. Example 14 includes the apparatus of example 1, wherein the NVM comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), write-in-place non-volatile memory, and volatile memory backed by a power reserve to retain data during power failure or power disruption. Example 15 includes the apparatus of example 1, further comprising one or more of: at least one processor, having one or more processor cores, communicatively coupled to the allocation logic circuitry, a battery communicatively coupled to the apparatus, or a network interface communicatively coupled to the apparatus.

Example 16 includes a method comprising: storing an original Logical address to Physical address (L2P) table entry and a shadow L2P table entry in Non-Volatile Memory (NVM); and causing, at allocation logic, storage of the original L2P table entry and the shadow L2P table entry sequentially in the NVM, wherein data read from the shadow L2P table entry indicates a state of the original L2P table entry. Example 17 includes the method of example 16, wherein a non-empty status of the data read from the shadow L2P table entry indicates that the original L2P table entry has been written and that the data read from the shadow L2P table entry is to be used to service a read request directed at the original L2P table entry. Example 18 includes the method of example 16, further comprising determining a non-empty status of the data read from the shadow L2P table entry based on a comparison of the data read from the shadow L2P table entry with an initialization value. Example 19 includes the method of example 16, wherein a non-empty status of the data read from the shadow L2P table entry indicates that the original L2P table entry has been written and that the data read from the shadow L2P table entry is to be used to service any subsequent read request directed at the original L2P table entry. Example 20 includes the method of example 16, further comprising updating system related data of the shadow L2P table entry to indicate whether the original L2P table entry has been previously written, not written, or written and deleted. Example 21 includes the method of example 16, further comprising performing a single block read operation directed at the NVM to read both the original L2P table entry and the shadow L2P table entry. Example 22 includes the method of example 16, further comprising storing the original L2P table entry and the shadow L2P table entry in physically contiguous memory cells.

Example 23 includes one or more computer-readable medium comprising one or more instructions that when executed on at least one processor configure the at least one processor to perform one or more operations to: store an original Logical address to Physical address (L2P) table entry and a shadow L2P table entry in Non-Volatile Memory (NVM); and cause, at allocation logic, storage of the original L2P table entry and the shadow L2P table entry sequentially in the NVM, wherein data read from the shadow L2P table entry indicates a state of the original L2P table entry. Example 24 includes the one or more computer-readable medium of example 23, further comprising one or more instructions that when executed on the at least one processor configure the at least one processor to perform one or more operations to cause determination of a non-empty status of the data read from the shadow L2P table entry based on a comparison of the data read from the shadow L2P table entry with an initialization value. Example 25 includes the one or more computer-readable medium of example 23, further comprising one or more instructions that when executed on the at least one processor configure the at least one processor to perform one or more operations to cause performance of a single block read operation directed at the NVM to read both the original L2P table entry and the shadow L2P table entry.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   Non-Volatile Memory (NVM) to store an original Logical address to Physical address (L2P) table entry and a shadow L2P table entry; and
   allocation logic circuitry to cause storage of the original L2P table entry and the shadow L2P table entry sequentially in the NVM,
   wherein data read from the shadow L2P table entry is to indicate a state of the original L2P table entry, wherein a non-empty status of the data read from the shadow L2P table entry is to indicate that the original L2P table entry has been written and that the data read from the shadow L2P table entry is to be used to service a read request directed at the original L2P table entry.

2. The apparatus of claim 1, comprising logic to determine the non-empty status of the data read from the shadow L2P table entry based on a comparison of the data read from the shadow L2P table entry with an initialization value.

3. The apparatus of claim 1, wherein the non-empty status of the data read from the shadow L2P table entry is to indicate that the original L2P table entry has been written and that the data read from the shadow L2P table entry is to be used to service any subsequent read request directed at the original L2P table entry.

4. The apparatus of claim 1, comprising logic to update system related data of the shadow L2P table entry to indicate whether the original L2P table entry has been previously: (a) written, (b) not written, or (c) written and deleted.

5. The apparatus of claim 4, wherein the system related data comprises a first block of a first media page of the NVM.

6. The apparatus of claim 4, wherein the system related data comprises a first block of a first media page of a first die of a first band of the NVM.

7. The apparatus of claim 1, wherein a single block read operation directed at the NVM is to read both the original L2P table entry and the shadow L2P table entry.

8. The apparatus of claim 1, wherein the NVM is to communicate with one or more components of a computing device through one or more of: an SATA (Serial Advanced Technology Attachment) interface, a Peripheral Component Interconnect (PCI), or a PCI express (PCIe) interface.

9. The apparatus of claim 1, wherein a Solid State Drive (SSD) comprises the allocation logic circuitry, the NVM, and no Dynamic Random Access Memory (DRAM).

10. The apparatus of claim 9, wherein the SSD comprises a storage device to store firmware, wherein the firmware is to cause the allocation logic circuitry to store the original L2P table entry and the shadow L2P table entry sequentially in the NVM.

11. The apparatus of claim 1, wherein the original L2P table entry and the shadow L2P table entry are to be stored in physically contiguous memory cells.

12. The apparatus of claim 1, wherein a hybrid drive comprises the NVM.

13. The apparatus of claim 1, wherein the NVM comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), write-in-place non-volatile memory, and volatile memory backed by a power reserve to retain data during power failure or power disruption.

14. The apparatus of claim 1, further comprising one or more of: at least one processor, having one or more processor cores, communicatively coupled to the allocation logic circuitry, a battery communicatively coupled to the apparatus, or a network interface communicatively coupled to the apparatus.

15. A method comprising:
storing an original Logical address to Physical address (L2P) table entry and a shadow L2P table entry in Non-Volatile Memory (NVM); and
causing, at allocation logic, storage of the original L2P table entry and the shadow L2P table entry sequentially in the NVM,
wherein data read from the shadow L2P table entry indicates a state of the original L2P table entry, wherein a non-empty status of the data read from the shadow L2P table entry indicates that the original L2P table entry has been written and that the data read from the shadow L2P table entry is to be used to service a read request directed at the original L2P table entry.

16. The method of claim 15, further comprising determining the non-empty status of the data read from the shadow L2P table entry based on a comparison of the data read from the shadow L2P table entry with an initialization value.

17. The method of claim 15, wherein the non-empty status of the data read from the shadow L2P table entry indicates that the original L2P table entry has been written and that the data read from the shadow L2P table entry is to be used to service any subsequent read request directed at the original L2P table entry.

18. The method of claim 15, further comprising updating system related data of the shadow L2P table entry to indicate whether the original L2P table entry has been previously: (a) written, (b) not written, or (c) written and deleted.

19. The method of claim 15, further comprising performing a single block read operation directed at the NVM to read both the original L2P table entry and the shadow L2P table entry.

20. The method of claim 15, further comprising storing the original L2P table entry and the shadow L2P table entry in physically contiguous memory cells.

21. One or more non-transitory computer-readable medium comprising one or more instructions that when executed on at least one processor configure the at least one processor to perform one or more operations to:
store an original Logical address to Physical address (L2P) table entry and a shadow L2P table entry in Non-Volatile Memory (NVM); and
cause, at allocation logic, storage of the original L2P table entry and the shadow L2P table entry sequentially in the NVM,
wherein data read from the shadow L2P table entry indicates a state of the original L2P table entry, wherein a non-empty status of the data read from the shadow L2P table entry is to indicate that the original L2P table entry has been written and that the data read from the shadow L2P table entry is to be used to service a read request directed at the original L2P table entry.

22. The one or more non-transitory computer-readable medium of claim 21, further comprising one or more instructions that when executed on the at least one processor configure the at least one processor to perform one or more operations to cause determination of the non-empty status of the data read from the shadow L2P table entry based on a comparison of the data read from the shadow L2P table entry with an initialization value.

23. The one or more non-transitory computer-readable medium of claim 21, further comprising one or more instructions that when executed on the at least one processor configure the at least one processor to perform one or more operations to cause performance of a single block read operation directed at the NVM to read both the original L2P table entry and the shadow L2P table entry.

24. The one or more non-transitory computer-readable medium of claim 21, wherein a Solid State Drive (SSD) comprises the allocation logic circuitry, the NVM, and no Dynamic Random Access Memory (DRAM).

25. The one or more non-transitory computer-readable medium of claim 21, wherein the original L2P table entry and the shadow L2P table entry are to be stored in physically contiguous memory cells.

* * * * *